No. 621,541. Patented Mar. 21, 1899.
W. S. RICHARDSON.
TUBULAR FASTENING.
(Application filed Feb. 21, 1898.)
(No Model.)
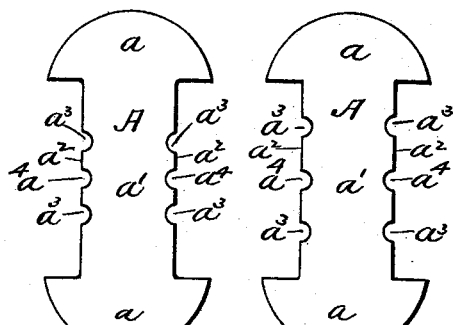
Fig. 1.  Fig. 2.
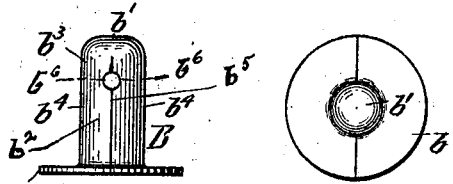
Fig. 3.  Fig. 4.
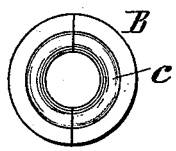
Fig. 5.
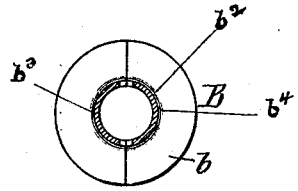
Fig. 6.
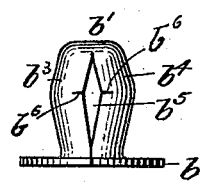
Fig. 7.
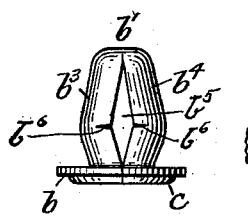
Fig. 8.
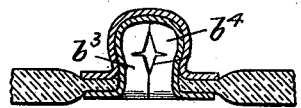
Fig. 9.
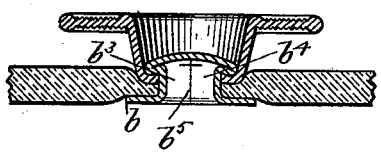
Fig. 10.
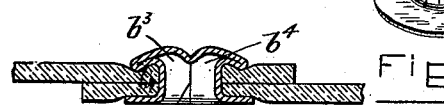
Fig. 11.
Fig. 14.
Fig. 12.
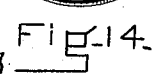
Fig. 13.
WITNESSES
INVENTOR
William S. Richardson

UNITED STATES PATENT OFFICE.

WILLIAM S. RICHARDSON, OF BOSTON, MASSACHUSETTS.

TUBULAR FASTENING.

SPECIFICATION forming part of Letters Patent No. 621,541, dated March 21, 1899.

Application filed February 21, 1898. Serial No. 671,017. (No model.)

*To all whom it may concern:*

Be it known that I, WILLIAM STREETER RICHARDSON, a citizen of the United States, residing at Boston, in the county of Suffolk and State of Massachusetts, have invented a new and useful Improvement in Tubular Fastenings, of which the following is a full, clear, and exact description, reference being had to the accompanying drawings, forming a part of this specification, in explaining its nature.

The invention relates to a tubular fastening or rivet having a preformed flange and a tubular shank; and it consists in providing the shank with the following-described means whereby the coöperating fastening-flange of the fastening is developed and formed from the shank in the act of setting the fastener.

Referring to the drawings, Figure 1 shows in plan a form of flat blank from which the fastening or rivet may be made. Fig. 2 is a view in plan of a similar blank, differing only from the blank of Fig. 1 with respect to the location of the flange-developing recesses. Fig. 3 is a view in side elevation of a complete fastening or rivet formed from a flat blank similar to the flat blank of Fig. 1. Fig. 4 is a view in plan of said rivet or fastening inverted, showing its preformed finishing-flange. Fig. 5 is a similar view of a rivet or fastening to represent a slight modification in the shape of the preformed flange to which reference will hereinafter be made. Fig. 6 is a view in horizontal section of the complete rivet upon the dotted line 6 6 of Fig. 3 and in plan of the preformed flange below said dotted line. Figs. 7 and 8 represent in elevation fastenings or rivets which have been set from the complete form of Fig. 3 to establish a bulging fastening-flange. They are formed from flat blanks similar to those of Figs. 1 and 2, reduced to the form of Fig. 3, and show the difference in the location of the fastening-flange due to a difference in the position of the flange determining or developing recesses with respect to the preformed flange. Fig. 9 is a view in longitudinal section of a ball member of a fastener and of my improved fastening or rivet used in conjunction therewith for fastening it to a glove or fabric, and it shows my improved fastening in its set form. Fig. 10 is a section of a button and of my fastening used to secure it to a garment and shows the fastening-flange as developed to a greater extent than does Fig. 9. Fig 11 is a view representing my fastening as used in riveting together two pieces of material. Fig. 12 is a view of a button and my improved fastener in longitudinal section to further illustrate the variation in the shape and position of its fastening-flange. Fig. 13 is a view in plan of the rivet and material of Fig. 11. Fig. 14 is a view in perspective of a tubular fastening in which the shank-slits are not extended through the preformed flange.

I prefer to make the fastening from a flat sheet-metal blank, although I do not confine myself thereto, and in the drawings I have shown a blank which is adapted to provide the shank of the fastening with two longitudinal sections or sides.

A, Figs. 1 and 2, represents the blank. They are substantially alike, excepting with respect to the flange starting and developing recesses, the variation in the position of which will be hereinafter explained. Each blank has the wide end sections $a$, the outer edges of which are curved, and the intermediate rectangular connecting-section $a'$, in the edges $a^2$ of which are two sets of recesses $a^3$ and the single set of recesses $a^4$. The blank is reduced by any suitable forming means to the complete fastening B, (represented in Figs. 3, 4, 5, and 6,) and which complete fastening has a preformed flange $b$, provided by the end sections $a$ of the blank, the closed top or end $b'$, and the tubular shank $b^2$, formed from the rectangular section $a'$ of the blank and consisting of the two sections or sides $b^3$ $b^4$, curved in cross-section and having between them the longitudinal slits $b^5$, from which extend into the said parts or sides $b^3 b^4$ lateral recesses $b^6$, provided in the blank by the recesses $a^3$, and which recesses $b^6$, in conjunction with the slits $b^5$, provide means for the formation of the fastening-flange, which coöperates with the preformed flange in the act of setting the fastener.

The recesses $a^4$ of the blank A are at the center of its length, and they are used for the purpose of permitting the freer and easier drawing and shaping of the metal blank in forming it into the closed top or end $b'$ of the fastener.

The recesses $a^3$ may be located in the blank anywhere between the recesses $a^4$ and the end $a$. In Fig. 1 these recesses are nearer the recesses $a^4$, and when so placed they locate the recesses $b^6$ of the fastening nearer the closed end $b'$ than the preformed flange $b$, or as in Fig. 3. In Fig. 2 these recesses $a^3$ are farther removed from the recesses $a^4$, and therefore in the complete fastening will be nearer the preformed flange than represented in Fig. 3. These lateral recesses in the sides of the shank so weaken the shank that upon the application of a setting pressure to the fastening the sides give way on the line of these recesses and begin to separate and fold outwardly, the slits permitting this operation to take place, and this outward folding continues so long as the pressure is applied and until a flange of any desired width or form is established. The relation of these lateral recesses with respect to the ends of the fastening determines the relation of the flanges of the fastening when set to each other and also to the part or thing which they may fasten to a glove, garment, or other article. These developing-recesses may also vary as to shape and as to size.

In Figs. 3, 4, 5, and 6 the edges of the sides $b^3$ $b^4$ and of the parts which make the preformed flange abut and the slits or lines of division $b^5$ are represented as extending from the closed top the entire length of the shank and wholly through the preformed flange; but I would say that my invention will be practiced if these slits or lines of division do not extend into or through the flange, and in Fig. 14 I have represented a construction in which they do not extend through the flange. In this event, however, the fastening will not be formed from a flat metal blank of the shape shown in Figs. 1 and 2, but from the type of flat blank usually employed in the manufacture of eyelets having preformed flanges and shanks with closed ends.

In Figs. 5 and 8 I have shown the preformed flange of the fastening as having a circular bead or rim $c$ about the entrance to the cavity of the fastening and upon the under side of the flange. This bead or rim is used in connection with the setting-die for maintaining the shape of the flange and preventing the separation thereof during the operation of setting the fastening, and it coöperates with a shoulder of the setting-die, which is arranged to bear against it during its setting operation.

The various types of flange developed from the shank are represented in various of the figures. For instance, in Figs. 7 and 8 the sides of the fastening are formed into a bulbous fastening-flange, the difference in the shape and location of the flange in the figures being occasioned by the difference in the location of the flange-determining recesses $b^6$.

Fig. 9 also represents the fastening as having a flange of the bulbous order and as used for attaching a ball or stud member of a fastener to a glove or garment.

In Fig. 10 the sides of the fastening are represented as developed into a flat fastening-flange, and the fastening is shown as attaching a type of button to a garment.

In Fig. 11 the fastening is represented as a rivet and the sides as developed into a flat fastening-flange.

In Fig. 12 the sides of the fastening are developed into a bulbous flange and the fastening is represented as securing a button with a tubular shank to a garment or material.

It will thus be seen that the fastening not only has means whereby the shape or form of its fastening-flange may be varied, but also means whereby the shape and location of the flange may be previously established, as well as the lengths of the tubular section of the fastening between the two flanges.

Having thus fully described my invention, I claim and desire to secure by Letters Patent of the United States—

1. As an improved article of manufacture a fastening having a preformed flange and a tubular shank separated into sections or parts by longitudinal slits, which sections or parts are provided with the fold-determining recesses $b^6$ extending from said longitudinal slits, whereby the said sections or parts are given a disposition to fold outwardly upon the application of end pressure to the fastening.

2. A blank from which a tubular fastening of the character specified is formed, having the sections $a$ which provide a preformed fastening-flange, the intermediate section $a'$ which forms the tubular part of the fastening and the sides of which are adapted to be folded outward to form a fastening-flange, which section $a'$ has shallow recesses $a^3$ in its edges for determining the place of said fold, and the recesses $a^4$ for assisting in the formation of the closed end of the fastener.

3. In a tubular fastening a hollow shank having side parts united at their ends and separated from each other by longitudinal slits, the said side parts having recesses extending into them from the slits to form predetermined places upon which they will fold outward on the application of end pressure to the fastening.

WILLIAM S. RICHARDSON.

Witnesses:
F. F. RAYMOND, 2d,
J. M. DOLAN.